US009225516B1

(12) United States Patent
O'Connor et al.

(10) Patent No.: US 9,225,516 B1
(45) Date of Patent: Dec. 29, 2015

(54) COMBINED AUTHENTICATION AND ENCRYPTION

(71) Applicant: WhatsApp Inc., Santa Clara, CA (US)

(72) Inventors: Bryan D. O'Connor, Atherton, CA (US); Eugene Fooksman, Santa Clara, CA (US)

(73) Assignee: WHATSAPP INC., Santa Clara, CA (US)

(*) Notice: Subject to any disclaimer, the term of this patent is extended or adjusted under 35 U.S.C. 154(b) by 218 days.

(21) Appl. No.: 14/045,192

(22) Filed: Oct. 3, 2013

(51) Int. Cl.
 *G06F 7/04* (2006.01)
 *H04L 9/08* (2006.01)
 *H04L 9/32* (2006.01)

(52) U.S. Cl.
 CPC ............. *H04L 9/0819* (2013.01); *H04L 9/3271* (2013.01)

(58) Field of Classification Search
 CPC .......................... H04L 9/3271; H04L 9/0838
 See application file for complete search history.

(56) References Cited

U.S. PATENT DOCUMENTS

| 7,603,556 | B2* | 10/2009 | Brown et al. | 713/169 |
| 8,023,927 | B1* | 9/2011 | Coleman et al. | 455/410 |
| 2007/0178885 | A1* | 8/2007 | Lev | 455/411 |
| 2008/0034216 | A1* | 2/2008 | Law | 713/183 |
| 2013/0004142 | A1* | 1/2013 | Grab et al. | 386/259 |

OTHER PUBLICATIONS

Arkko et al.; RFC 4187—Extensible Authentication Protocol Method for 3rd Generation Authentication and Key Agreement (EAP-AKA); 2006; Retrieved from the Internet <URL: tools.ietf.org/html/rfc4187>; pp. 1-79 as printed.*

* cited by examiner

*Primary Examiner* — Michael Chao
(74) *Attorney, Agent, or Firm* — Kacvinsky Daisak Bluni, PLLC

(57) ABSTRACT

A system and methods are provided for establishing an authenticated and encrypted communication connection between two devices with at most two round-trip communications. During establishment of an initial authenticated, encrypted communication connection (or afterward), a first device (e.g., a server) provides the second device (e.g., a client) with a token (e.g., a challenge) that lives or persists beyond the current connection. After that connection is terminated and the second device initiates a new connection, it uses the token as part of the handshaking process to reduce the necessary round-trip communications to one.

15 Claims, 3 Drawing Sheets

COMBINED AUTHENTICATION AND ENCRYPTION

BACKGROUND

This invention relates to the field of electronic communications. More particularly, a system and methods are provided for establishing a combined authenticated and encrypted communication connection between two devices with minimal round-trip handshaking.

As the use of mobile communication platforms continues to grow, users operate more and more applications that require creation and maintenance of separate communication connections. Each application may require a separate connection with a different server or service. With so many connections being created, possibly each time the user opens an application, it becomes noticeable if establishment of a connection for a particular application is slow and his or her use of the application is delayed.

Traditional methods of reliably authenticating a user and establishing a secure communication connection can require many round-trip communications between a user's device and a server. This may be acceptable in a traditional computing environment (e.g., with desktop or other stationary computing devices having wired connections), but is unacceptable in a mobile environment (e.g., with smart phones and portable computing devices having wireless connections) and can markedly delay a user's connection. To speed their connections, some applications forego encryption and/or reliable authentication, but this leaves their users vulnerable to data theft, spoofing and/or other cyber assaults.

SUMMARY

In some embodiments of the invention, a system and methods are provided for establishing an authenticated and encrypted communication connection between two devices, such as a client device (e.g., a smart phone, a mobile computing device) and a server hosting an application executed on the client device.

In these embodiments, at most two round-trip communications between the devices are required to establish the authenticated and encrypted connection, but only a single round-trip is required in many or most situations. This optimization is enabled through the use of a token or challenge that has an extended lifetime (i.e., beyond the current connection in which it is provided). Whereas such a token traditionally would be valid for only the time necessary to establish a session or, at most, for the length of that session, in these embodiments a token may persist for a longer period of time (e.g., one hour, four hours, eight hours).

DETAILED DESCRIPTION

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, a system and methods are provided for rapid creation of an authenticated, secure (i.e., encrypted) communication connection between two devices (e.g., a client and server). In these embodiments, the number of round-trip handshaking communications necessary to establish the authenticated, secure connection may depend on how recently the two devices have been actively communicating.

Illustratively, if the devices have recently communicated via an authenticated and encrypted connection, they may use an artifact or token of that recent communication connection as a challenge or seed for creating a new connection with just a single round-trip exchange of information. If they have not recently communicated, multiple (e.g., two) round-trips may be required.

Figure 1:
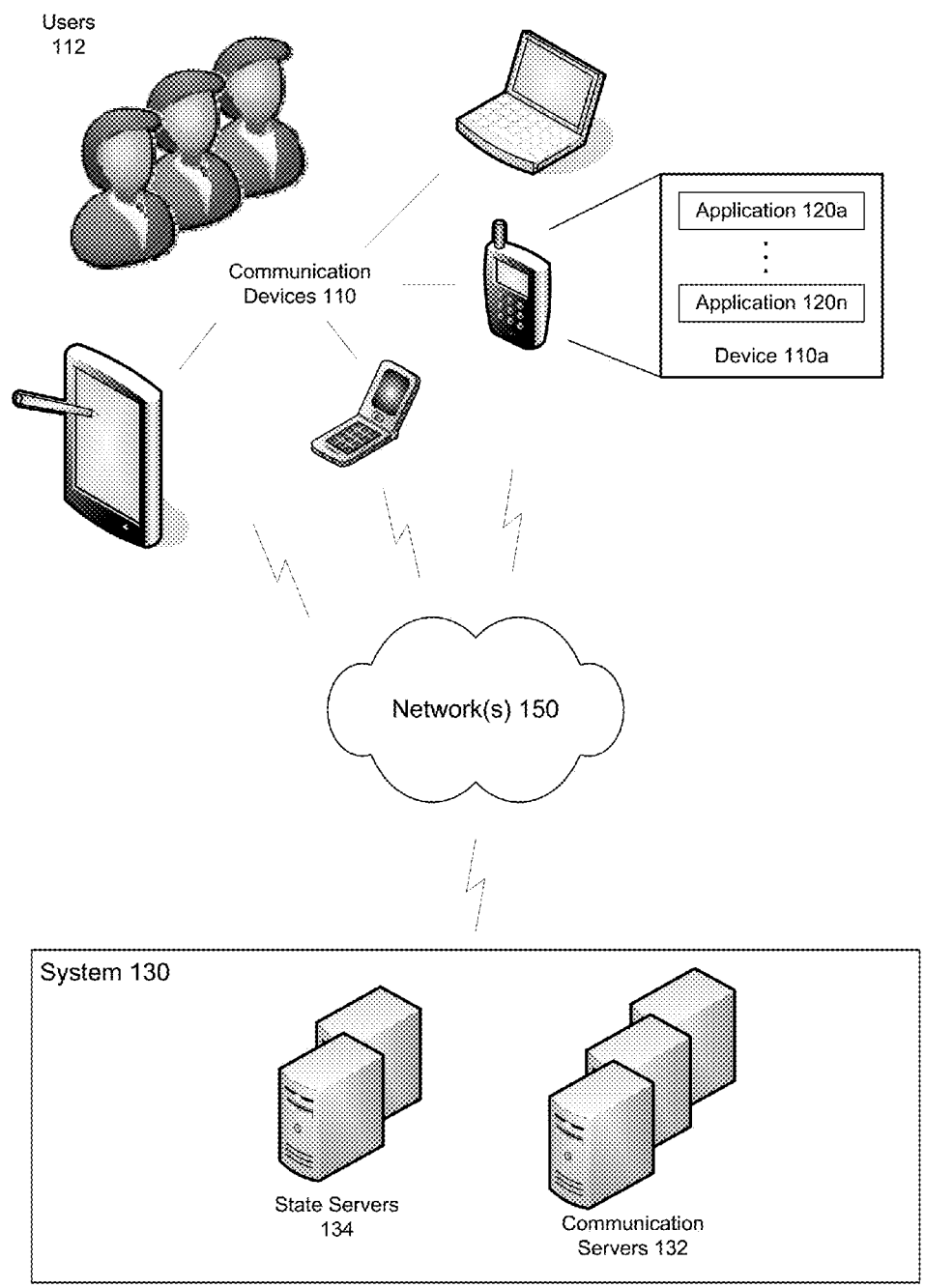
FIG. 1 is a block diagram depicting a communication environment in which some embodiments of the invention may be implemented.

FIG. 1 is a diagram of a communication environment in which some embodiments of the invention may be implemented. In these embodiments, communication devices 110 operated by users 112 host the same or different operating systems (e.g., Android, BlackBerry, iOS, Nokia S40, Symbian, Windows Phone), and execute any number of applications that require interaction with a central server or service.

For example, application 120a executing on device 110a allows text, images, audio, video and/or other electronic information to be exchanged between device 110a and one or more other devices 110 via data communication channels that transit system 130 and that conform to any wireless data communication technologies now known or hereafter developed (e.g., Wi-Fi). Rather than relying upon traditional wireless voice communication channels that provide limited support for instant or real-time communications other than live voice conversations, some or all of the data communication channels established to support application 120a allow unconstrained exchange of virtually all types of communications and media between devices of the same and/or different types.

Application 120a is hosted by system 130, which is a data center or other cooperative collection of computer resources, including communication servers 132, state servers 134 and/or other components. Communication servers 132 are front-end components of system 130 that host users' connections with the system and that facilitate the exchange of communications between users. Servers 132 may be referred to as "chat" servers, in that they receive real-time messages and chat session communications from individual users for delivery to one or more other users. Servers 132 may support either or both individual chat sessions (i.e., between two users) and group chat sessions (i.e., more than two users).

Illustratively, as long as a user is on-line with system 130 and the application is executing on his or her device, a connection or session may be maintained between the device and a communication server 132. When the user closes the application on the device, his or her connection may persist for some period of time (e.g., five minutes, fifteen minutes).

State servers 134 maintain states or statuses of users and/or users' devices. Thus, a state server stores some or all of a user's profile, including applicable preferences (e.g., preferred audible and/or visual alert, status message), user identifier, device type/model and/or other device details, other persistent data, etc. Some status information maintained by a state server with regard to a user may persist for the duration of the user's connection with system 130 and/or some period of time afterward. As the user's device operates in different ways or different modes, goes offline, comes online and so on, a state server may capture those changes and may distribute that information to associated users (e.g., friends, users who recently chatted with the user).

Network(s) 150 comprise communication paths between devices 110 and system 130, and may include data and/or voice communication channels. For carrying data communications, networks 150 may comprise the Internet, one or more intranets, LANs (Local Area Networks), WANs (Wide Area Networks) and/or other point-to-point or distributed connections, which may be wired or wireless. For carrying voice communications, network(s) 150 may comprise wired and/or wireless voice communication links managed by different telecommunication service providers and implementing virtually any wireless technology, such as Global System for Mobile Communications (GSM), Enhanced Data Rates for GSM Evolution (EDGE), Long-Term Evolution (LTE), Code Division Multiple Access (CDMA), Evolution-Data Optimized (EV-DO) and so on.

Networks 150 may thus comprise various entities not shown in FIG. 1, such as routers, gateways, switches, base stations (e.g., wireless access points, Node Bs, Evolved Node Bs) and/or other equipment for establishing, maintaining, switching or otherwise manipulating a data and/or voice connection.

In some embodiments of the invention, a client device operating an application hosted by system 130 initiates and establishes an encrypted and authenticated communication connection with the system with no more than two round-trip communications between the device and the system. When re-connecting after being disconnected for a limited period of time, the device can initiate and establish an encrypted and authenticated communication connection with just a single round-trip communication.

Figure 2:
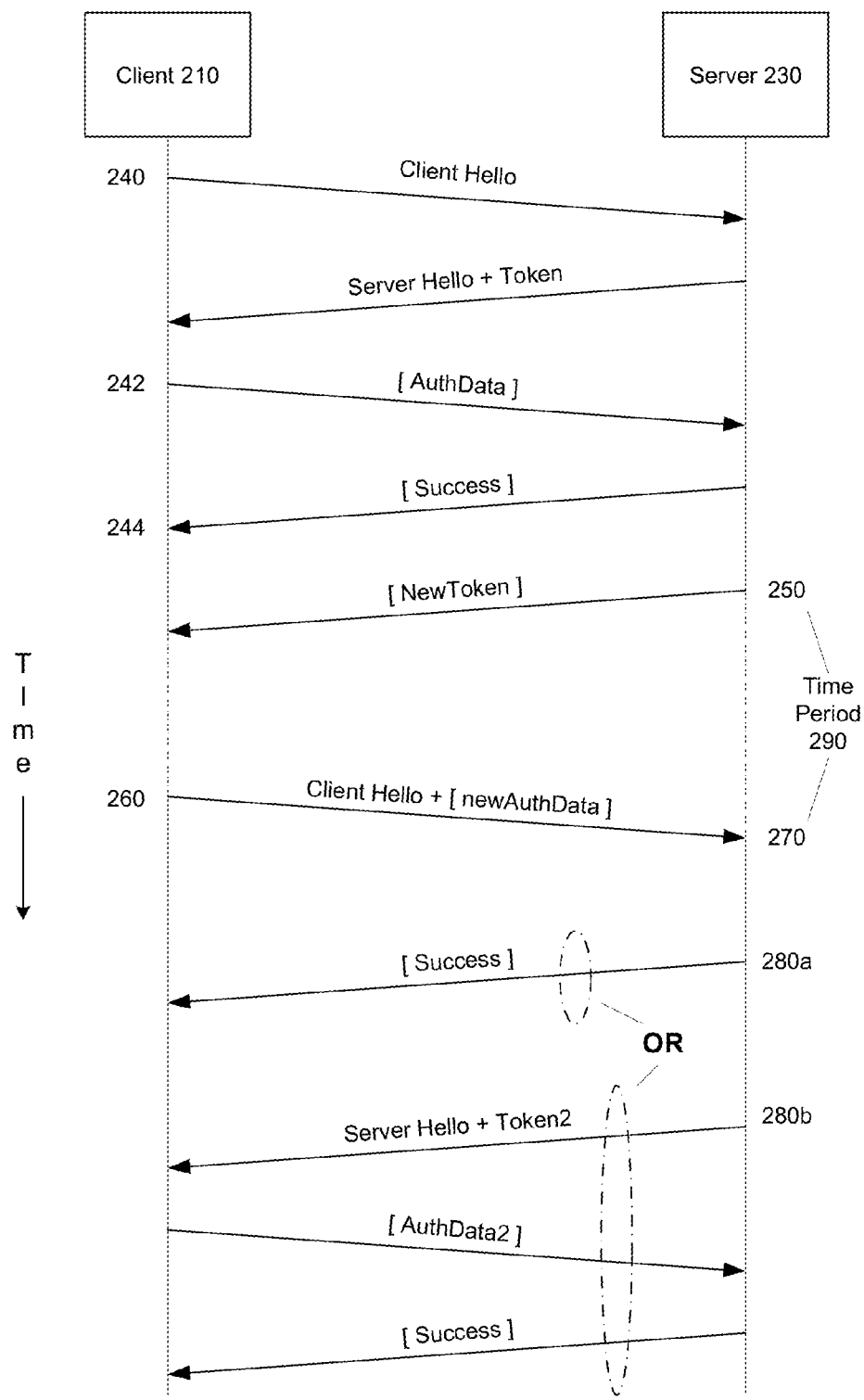
FIG. 2 is a time sequence diagram illustrating methods of establishing a combined authenticated and secure communication connection, in accordance with some embodiments of the invention.

FIG. 2 is a time sequence diagram illustrating methods of establishing a combined authenticated and secure communication connection, according to some embodiments of the invention.

In these embodiments, client device 210 (e.g., a smart phone, a portable computing device) must connect to server 230, which hosts an application such as application 120a of FIG. 1, and which uses 802.11 data communication connections and/or other data communications compatible with the wireless technologies identified above. Other embodiments of the invention may be implemented for use with other applications compatible with device 210.

At time 240, a user of client 210 activates or opens the application and an initial Client Hello message is dispatched toward server 230, which may be one of multiple servers hosting the application. The application executes under the host operating system of the client device, but in some implementations the operating system platform (e.g., iOS, Windows Phone) does not allow the application to be woken or otherwise activated by server 230. In these implementations, therefore, a connection between the application on the client device and the application on the server cannot be initiated until the user activates the application on client 210.

The client hello message may identify the client and/or the user (e.g., by user identifier, by username, by device identifier), and may include a protocol identifier (e.g., to indicate that the client can apply a protocol to perform authentication and encryption together) and/or other information. For example, a client-generated value may be included for use in generating a token or shared secret. In the illustrated implementation, the client hello is not encrypted, but in other implementations it may be encrypted (e.g., in the single round-trip method described below).

In response to the client hello message, server 230 returns a Server Hello message and a token that will be used to finalize the authenticated and encrypted connection. The server hello message may confirm the protocol in use, provide a session identifier and/or may include other information. The token may be considered a server challenge and may be randomly generated (e.g., on the order of 32 bytes long).

At 242, client 210 generates a session key for the new connection and uses it to generate a set of data (i.e., AuthData) that will allow server 230 to authenticate client 210 (and the user) and confirm encryption of the connection. The brackets indicate that the AuthData message is encrypted.

In some embodiments, the session key (SK) is generated by applying a suitable function to a set of data that includes the server-provided token and a secret shared between the client and the server. An exemplary shared secret is the user's password for the communication application, which is known at the client device and at the server before the connection process of FIG. 2 commences. In some implementations, the user may not know or be aware of the password because the application may automatically store it on the client device (upon generation by the system that hosts the application), and produce it as needed without requiring action by the user.

One suitable function for generating the session key is PBKDF2 (Password-Based Key Derivation Function 2). When PBKDF2 is used, the "password" parameter for the function may be the application password for the user/device, and the "salt" parameter may be the server token; the hashing function may be HMAC SHA1 (Hash-Based Message Authentication Code/Secure Hash Algorithm 1).

The number of iterations used within the function may be on the order of 1,024, but this may vary depending on the configuration of device 210 (e.g., the type/speed of its processor). The length of the session key may vary from one embodiment to another, but an illustrative length is 20 bytes.

Session key SK is then used with a suitable encryption scheme, preferably a stream cipher (or state cipher) such as RC4™ (Rivest Cipher 4), to generate the authentication data AuthData. Specifically, using RC4, the keystream is generated from SK and is applied to encrypt a plaintext string to produce AuthData.

Composition of the plaintext string may differ from one embodiment to another, but an illustrative string is composed of concatenated (or otherwise combined) strings representing the user ID, the server token, a timestamp and some data specific to the device (e.g., user agent, device type or model, device ID).

The same encryption scheme (e.g., RC4) may be used during the connection (after it is established) to secure communications between the client and the server. In some implementations, the "drop X" option is applied to generate an initial X bytes with the cipher and discard them before encrypting AuthData. Illustrative values of X are 256, 512, 1,024, etc.

Thus, at 242, client 210 generates session key SK and uses it to encrypt a string of data known to the client and server 230. The encrypted set of AuthData is then sent to the server.

Upon receipt of the encrypted AuthData, which the server was expecting after sending its hello message and the token, the server will separately generate what it thinks should be the session key (or may do so anytime after sending the server hello+token message), using the same process and parameters as the client. Assuming that it obtains the appropriate session key SK, server 230 proceeds to decrypt the encrypted AuthData.

Once decrypted, the server parses the plaintext to verify that it contains correct or appropriate information. For example, it already knows the user ID and token, and can therefore verify that those values in AuthData are correct. It can also verify that the timestamp field is formatted correctly and could perform a validity check (e.g., to determine that the indicated time is after the server hello message and within an appropriate range of time). The server can also verify that the device-specific string is something that the server recognizes (and perhaps that it matches information stored at the system in server 230, or another system component such as a state server).

Assuming that the server can decrypt AuthData and verify its contents, client 210 and the user have been authenticated and the client and server have agreed upon an encryption scheme for encrypting some or all communications they exchange from this point on. Server 230 will issue a Success message acknowledging successful completion of the connection process. Thus, at 244, client 210 and server 230 have established an authenticated and encrypted communication connection.

Further, however, at 250 the server sends a new or future token to client 210 which, as described below, can be used by the client to re-connect to server 230 after their current connection ends. Illustratively, the connection may be terminated when the application terminates on device 210 (e.g., when the user closes it or opens another application), when device 210 is rebooted, when an extended period of time passes with no application activity, etc.

In some embodiments of the invention, this newToken is included in the success message that finalizes the current connection, or in a later communication during the same connection. Also in some embodiments, the server may periodically send a replacement for this new token during the present connection. The lifetime of the unsolicited token (as opposed to the solicited token the server dispatched in response to the client hello message sent at 240) may be on the order of 1 hour, 2 hours, 4 hours, etc., but in these embodiments is valid beyond termination of the current connection. The new token may be stored at system 230 and/or at some other system component, such as a state server.

Different users/devices or types of users/devices may be supplied with tokens with different lifetimes (e.g., based on device platform, geographical location, frequency or level of use of the application). Because the client may not be advised of the lifetime or expiration of the newToken, it may simply use it for the next connection attempt regardless of the amount of time that has elapsed since the previous connection terminated.

An embodiment of establishing an authenticated and encrypted communication connection with just a single round-trip communication is illustrated in FIG. 2 starting at 260. Because the communication connection established above (between 240 and 244) has been terminated for some period of time, client 210 and server 230 have no existing connection at 260, or at least no connection that supports the application.

At 260 the user of client device 210 opens the application again. Therefore, the client device issues a new client hello message toward server 230, but in this scenario includes a new encrypted set of AuthData.

The encrypted newAuthData sent at 260 is generated in the same manner as the previous AuthData. In particular, using the newToken sent by the server at 250 (or sent at some other time), and the user/device password or some other shared secret, client 210 generates a new session key SK. Using a suitable encryption scheme, key SK is used to encrypt a string composed of specified information (e.g., user ID, newToken, a timestamp and device-specific data) to produce newAuthData.

Upon receipt of the encrypted newAuthData at 270, server 230 identifies client 210 (e.g., from the client hello) and generates its own version of the session key, using the last token provided to client 210 (i.e., newToken), and attempts to decrypt newAuthData. If the encrypted newAuthData was received within the lifetime of newToken (i.e., time period 290≤lifetime of newToken), the server should generate the correct key SK and be able to decrypt newAuthData to retrieve and verify the specified information as described above. The server will respond to the new client hello and newAuthData at 280a or 280b, depending on whether or not newToken is still valid at 270 (and whether it is received from the same client).

In particular, if server 230 successfully decrypts newAuthData, at 280a it returns a Success message (or other message to the same effect), and the client and the server have established a new authenticated and encrypted communication connection with one round-trip communication.

If, however, newToken had expired by the time server 230 received the newAuthData message at 270, the authentication/encryption process simply degenerates into a two round-trip process, with half of the first round-trip complete. Specifically, the server treats the client hello and newAuthData message received at 270 as a new client hello (and ignore newAuthData), and will respond at 280b with a server hello and a new token/challenge (i.e., Token2). The client will use that token to create and encrypt another set of authentication data to send to the server as AuthData2. Server 230 will decrypt AuthData2 to authenticate the user/device, verify that proper encryption has been established and complete the new connection.

In embodiments of the invention, the newToken provided to client 210 from server 230 at 250 is valid for a single connection attempt. If the client somehow uses the wrong token in a connection attempt, the server may simply respond as if the client was attempting an initial connection, and send back a new token for use in generating and sending a new set of AuthData.

Figure 3:
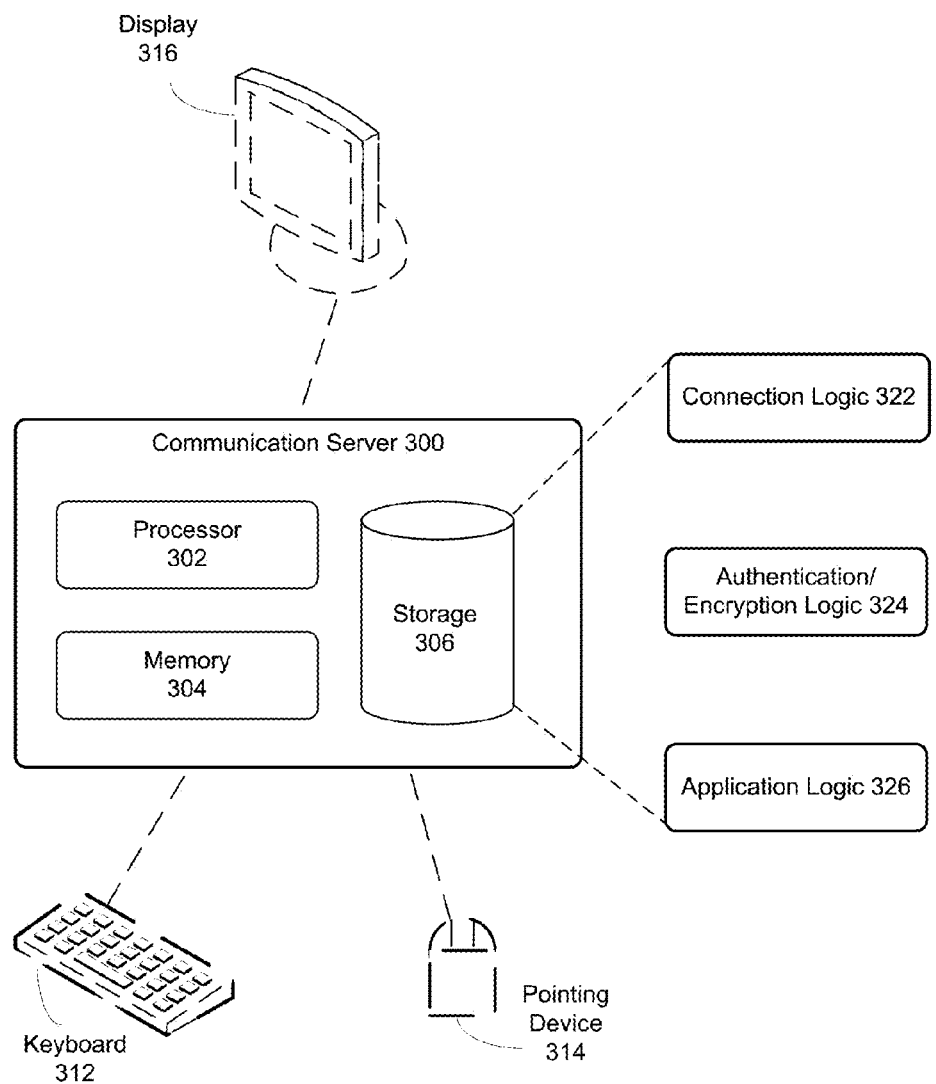
FIG. 3 depicts a communication server for establishing a combined authenticated and secure communication connection, in accordance with some embodiments of the invention.

FIG. 3 is a block diagram of a communication server for establishing an authenticated and encrypted communication connection according to some embodiments of the invention. Although only a single server 300 is depicted, it will be understood that a system, site or service hosting a compatible application may comprise any number of communication servers and/or other components (e.g., state servers) that cooperate to execute the application and support user connections.

Communication server of FIG. 3 comprises processor 302, memory 304 and storage 306, which may comprise one or more optical and/or magnetic storage components. Server 300 may be coupled (permanently or transiently) to keyboard 312, pointing device 314 and display 316. The communication server may include other components omitted in the interest of clarity, such as communication modules for communicating via wired and/or wireless communication links, interface components for interfacing with other external devices such as storage devices, a proxy server, a router, a load balancer, web servers, other system servers, etc.

Storage 306 of the apparatus stores logic that may be loaded into memory 304 for execution by processor 302. Such logic includes connection logic 322, authentication/encryption logic 324 and application logic 326. Memory 304 may also store various data generated or used by server 300, such as tokens (e.g., challenges), user passwords, device parameters and so on, which may also be permanently stored in storage 306.

Connection logic 322 comprises processor-executable instructions for receiving and managing connections with devices operated by users of the application hosted by server 300. These instructions may allow server 300 to identify connection requests, apply the correct protocol(s) to establish/maintain connections, terminate connections, exchange protocol messages that support the application, etc.

Authentication/encryption logic 324 comprises processor-executable instructions for authenticating a user/device and for encrypting and decrypting information (e.g., messages, communications) exchanged with user devices. In some embodiments, logic 322 and logic 324 are merged; in other embodiments they are further subdivided. In these embodiments, however, connection logic, authentication logic and encryption logic cooperate to support establishment of authenticated and encrypted communication connections with one or two round-trip communications with a client device, as described above.

Application logic 326 comprises processor-executable instructions for receiving communications from users of the application and delivering them to other users. These communications are delivered in real-time if the recipient(s) are online and connected to server 300 (or a cooperating server). If a recipient is offline, a message may be temporarily stored (e.g., on a message server) for later delivery.

An environment in which some embodiments of the invention are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which can be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of establishing an authenticated and encrypted communication connection between two devices, the method comprising, at a first device:
   during a first communication connection with a second device, providing the second device with a first token; and
   after termination of the first communication connection:
      receiving from the second device encrypted authentication data;
      generating a session key from the first token;
      attempting to decrypt the encrypted authentication data with the session key;
      if the encrypted authentication data can be decrypted with the session key, acknowledging to the second device establishment of a second communication connection as part of a single round trip that comprises the receiving of the second device encrypted authentication data and the acknowledging of the establishment of the second communication connection; and
      if the encrypted authentication data cannot be decrypted with the session key:
         providing the second device with a second token;
         receiving from the second device new encrypted authentication data;
         generating a new session key from the second token;
         decrypting the new encrypted authentication data with the new session key; and
         acknowledging to the second device establishment of a second communication connection.

2. The method of claim 1, wherein the authentication data comprises:
   an identifier of a user of the second device;
   a token provided by the first device; and
   device-specific data.

3. The method of claim 2, wherein the authentication data further comprises:
   a timestamp.

4. The method of claim 2, wherein the user identifier is a telephone number of the user.

5. The method of claim 2, wherein the device-specific data is a user agent operating on the second device.

6. The method of claim 2, wherein the token is one of the first token and the second token.

7. The method of claim 1, wherein generating the session key comprises applying a function to the first token and to a secret shared between the first device and the second device.

8. The method of claim 7, wherein the shared secret is a password to an application hosted by the first device and executed on the second device.

9. A method of establishing an authenticated and encrypted communication connection between two devices, the method comprising, at a first device:
   before termination of a first communication connection between the first device and a second device, providing the second device with a persistent challenge; and
   after termination of the first communication connection, establishing a second communication connection with the second device with a single round-trip communication comprising:
      receipt of a set of encrypted authentication data generated by the second device based in part on the persistent challenge and a secret shared by the first device and the second device; and transmission of an acknowledgement of the second communication connection.

10. The method of claim 9, further comprising, after receipt of the set of encrypted authentication data:
   generating a session key based in part on the persistent challenge and the shared secret;
   decrypting the encrypted authentication data with the session key; and
   parsing the decrypted authentication data to verify its content.

11. The method of claim 9, wherein the content of the decrypted authentication data includes:
   a user identifier of a user of the second device; and
   the persistent challenge.

12. The method of claim 11, wherein the shared secret is a password for an application executed on the second device and hosted by the first device.

13. A system for establishing an authenticated and encrypted communication connection with a client device, the system comprising:
   a processor; and
   memory configured to store instructions that, when executed by the processor, cause the system to:
   during a first connection with the client device, provide the client device with a temporary challenge;
   after termination of the first connection, receive a set of authentication data encrypted with a key generated from the temporary challenge;
   generate a session key based in part on the temporary challenge and a secret shared with the client device; and
   if the encrypted authentication data can be decrypted with the session key, acknowledge establishment of a second connection with the client device in a single round trip without sending any other communications to the client device after receipt of the encrypted authentication data.

14. The system of claim 13, wherein:
   the shared secret is a password for an application executed on the client device and hosted by the system; and
   the authentication data comprises a telephone number of the client device.

15. The system of claim 13, wherein the memory is further configured to store instructions that, when executed by the processor, cause the system to:
   if the encrypted authentication data cannot be decrypted with the session key:
   provide the client device with a new challenge;
   receive a new set of authentication data encrypted with a new key generated from the new challenge;
   generate a new session key based in part on the new challenge and the secret shared with the client device;
   decrypt the new encrypted authentication data with the new session key;
   parse the decrypted authentication data to authenticate the client device; and
   acknowledge establishment of the second connection with the client device.

* * * * *